United States Patent Office 3,341,184
Patented Sept. 12, 1967

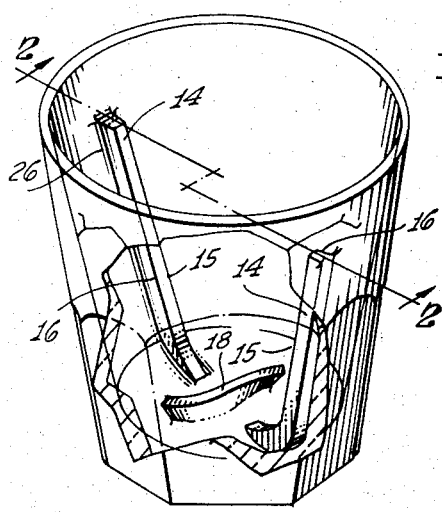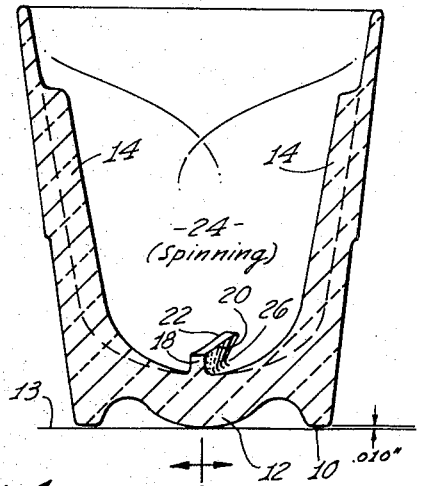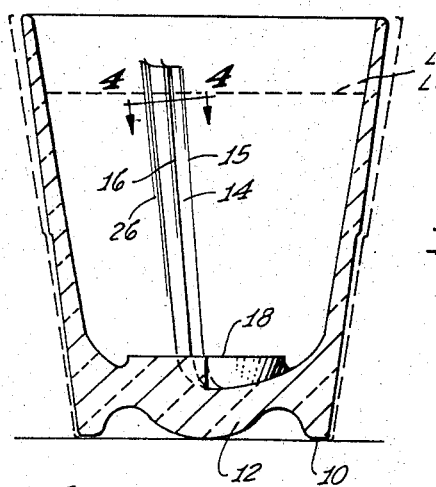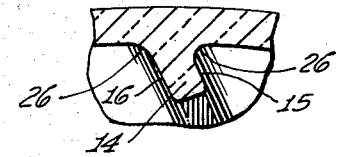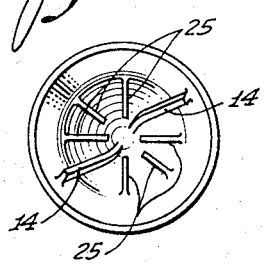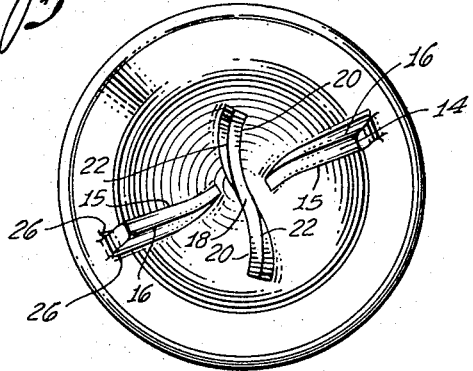

3,341,184
ROTARY RECEPTACLE FOR MIXING LIQUIDS
Ted F. Merrill, 6020 Acacia, Los Angeles, Calif. 90026
Filed July 26, 1966, Ser. No. 567,996
12 Claims. (Cl. 259—81)

ABSTRACT OF THE DISCLOSURE

The disclosed embodiment of the invention is a small tumbler shaped to be spun on its axis like a top and to come to rest in a tilted liquid-holding position. With the ingredients of a drink in the tumbler the ingredients may be thoroughly mixed by simply twirling the tumbler to cause it to spin briefly like a top.

This invention relates to a method of intermixing the ingredients of a liquid mixture and further encompasses means to carry out the method. While the invention is broadly applicable for its purpose, it has special advantages for preparing individual servings of mixed beverages including alcoholic beverages as well as instant beverages incorporating powdered ingredients.

A feature of the preferred practice of the invention is the concept of employing a receptacle in a manner to serve two separate purposes, the receptacle being used both for premixing the ingredients of the beverage and for serving the mixed beverage. This preferred practice of the invention is disclosed herein by way of example and will provide adequate guidance to those skilled in the art for various other specific practices of the invention.

The invention is based on the concept of spinning a receptacle on a support surface in the manner of a toy top for the purpose of blending the ingredients of a liquid mixture in the receptacle. One requirement for carrying out this concept is that the receptacle be not only shaped to spin like a top but also be shaped to come to rest at a stable upright position.

A second requirement is that the ratio of the mass of the receptacle relative to its size or capacity be high so that when rotation of the receptacle is initiated, the receptacle will spin like a top with sufficient inertia to rotate independently of the liquid content in opposition to the drag of the liquid content for a sufficient period of time to impart rapid rotation to the liquid content.

It has been found to be highly advantageous to employ a receptacle of noncircular interior cross-sectional configuration for the sake of promoting turbulence in the mixture. Thus in the preferred practice of the invention the receptacle is formed with integral inner ribs or vanes that provide two sets of shoulders or surfaces facing in opposite directions of rotation.

Simply using the fingers of one hand to twirl such a beverage-containing receptacle on a flat surface such as a table top or a counter top causes the receptacle to spin in upright position like a toy top with gyroscopic stability for a substantial period of time and then to come to rest at a slightly tilted position.

The unique result is a mixing operation comprising two distinct stages. In the first stage the spinning receptacle gradually decelerates because of three factors, namely, the frictional contact of the receptacle with the table top, the drag of the ambient air on the outer surface of the receptacle and the drag of the liquid content on the inner surfaces of the receptacle. The drag of the liquid content which is promoted by the ribs or vanes results in the transfer of kinetic energy from the receptacle to the liquid content with consequent accelerating rotation of the liquid content. This first stage, in which the rotation of the liquid content accelerates but lags behind the rotation of the receptacle, ends when the decelerating speed of rotation of the receptacle equals the accelerating speed of the rotation of the liquid content. In the second stage, the receptacle slows down to a complete stop but the liquid content continues to rotate at a progressively diminishing rate.

The mixing action, of course, is caused by relative rotation between the liquid and the receptacle and it is apparent that the direction of rotation of the liquid relative to the receptacle, i.e. the relative rotation as "seen" by the receptacle actually reverses in the second stage of the mixing operation. Thus one set of shoulders or surfaces of the ribs or vanes acts on the liquid body with turbulent effect during the first mixing stage and the second opposite set of shoulders or surfaces of the ribs or vanes act on the liquid body during the second stage.

For most mixtures, the two stages together provide more turbulence than is actually necessary for thorough intermixture of the ingredients of the liquid body. In other words, the mixing of the two ingredients is normally completed in the first stage.

The features and advantages of the invention may be understood from the following detailed description and the accompanying drawing.

In the drawing, which is to be regarded as merely illustrative:

FIG. 1 is a perspective view, partly broken away, showing the presently preferred embodiment of the receptacle for mixing and serving beverages;

FIG. 2 is a transverse section taken as indicated by the angular line 2—2 of FIG. 1, the view showing the receptacle spinning like a top with a liquid body therein;

FIG. 3 is a diametrical section taken as indicated by the line 3—3 of FIG. 2 and showing the receptacle stationary at a slightly tilted position;

FIG. 4 is a fragmentary transverse section taken as indicated by the line 4—4 of FIG. 3 and showing how a vane of the receptacle may be inclined in one rotary direction;

FIG. 5 is a plan view of the receptacle; and

FIG. 6 is a plan view on a smaller scale of a modified form of the receptacle.

It has been found that, for the purpose of the invention the receptacle may well be of the general configuration of a relatively short conventional glass tumbler of the type that is commonly employed for serving a drink having an alcoholic ingredient mixed with at least one non-alcoholic ingredient. Both the general configuration and the heavy construction of such a conventional tumbler are desirable for the purpose of the present invention. The squat configuration with the relatively thick bottom wall results in a low center of gravity and placing a quantity of liquid in the tumbler lowers the center of gravity even further to result in high stability when the liquid-containing tumbler is spun like a top. The heavy construction of the tumbler is especially important in that it provides a relatively large mass to result in relatively high inertia when the tumbler is spun like a top. The high inertia of the tumbler causes the tumbler to rotate initially independently of the liquid content for a substantial period of time during which the tumbler imparts kinetic energy to the liquid content. The amount of kinetic energy that is imparted depends upon the mass of the tumbler relative to the mass of the liquid content and fortuitously for the purpose of the invention, a squat glass tumbler of conventional configuration has a mass that is high relative to the liquid capacity of the tumbler. The rapidity of the transmission of kinetic energy to the body of liquid further depends on the ratio between the area of mutual contact and the volume of the liquid and again the configuration of a conventional squat tumbler is advantageous because the area of the inner surface of the tumbler is large relative to the volumetric capacity of the tumbler.

In FIGS. 1 to 5 of the drawing, the tumbler is of the described general configuration. The exterior bottom of the tumbler is formed with a rim 10 and a conventional tumbler of this type is capable of resting flat on such a bottom rim. For the purpose of the invention, however, the tumbler is formed with an exterior axially projecting bottom portion or boss 12 which, as shown, may be of the configuration of a smooth bulge. It is contemplated that the boss 12 will extend slightly below the level of the bottom rim 10, say .010″ below the level of the rim to permit the receptacle to spin like a top in upright position on the boss 12. Thus FIG. 3 shows the tumbler spinning in upright position on the axial boss 12 with the rim 10 spaced above the table top 13 that supports the tumbler.

If the interior of the tumbler is of smooth circular cross section the drag of the liquid body on the inner surface of the tumbler will be relatively low but, nevertheless may be sufficient in some instances to impart substantial kinetic energy to a liquid content with consequent mixing action on the ingredients of the liquid content. In the preferred practice of the invention, however, turbulent flow rather than laminar flow at the interface between the liquid body and the tumbler wall is preferred for highly effective resultant mixing action and therefore the cross-sectional configuration of the interior of the tumbler is of a suitable noncircular configuration. More specifically, a noncircular configuration is desirable that provides shoulders facing in the two opposite rotary directions so that one set of shoulders will be effective to create turbulence when one direction of relative rotation occurs between the liquid and the tumbler, the other set of shoulders being effective when the opposite relative rotation occurs. In the preferred practice of the invention illustrated by the drawing, the oppositely facing shoulders are opposite surfaces of internal vanes that are integral with the material of the tumbler. Thus if the tumbler is made of glass to provide a relatively high mass, the vanes may be molded into the glass.

In the first embodiment of the invention shown in FIGS. 1 to 5, two diametrically opposite upright vanes 14 are provided on the interior of the tumbler, the vanes extending down the opposite sides of the tumbler and merging with the bottom wall of the tumbler as shown. The two vanes 14 provide one set of two shoulders or surfaces 15 that face in the clockwise rotary direction and a second set of two shoulders or surfaces 16 that face in the counterclockwise rotary direction. Since a righthanded person will ordinarily spin the tumbler clockwise and since, as heretofore stated, usually the mixing action is completed in the first stage of the mixing operation, the two vanes 14 may be inclined or swept forward in the clockwise direction as shown in section in FIG. 4. With each of the two vanes angled into the lagging liquid body during the first stage of the mixing operation, increased turbulence is produced to promote the mixing action.

The preferred embodiment of the invention further includes a transverse vane 18 extending across the bottom of the interior of the tumbler. The bottom vane 18, in effect, comprises two interconnected radial ribs that provide one set of two shoulders or surfaces 20 facing in the clockwise direction and a second set of two shoulders or surfaces 22 facing in the counterclockwise direction.

When the tumbler with a liquid body 24 therein is spun in either rotary direction, the liquid body is initially substantially stationary but kinetic energy is progressively transmitted to the liquid body until the liquid body rotates rapidly with the upper surface of the liquid body concave as indicated in FIG. 2. Assuming that the tumbler is spun clockwise, kinetic energy is transferred to the liquid body from the tumbler at a rapid rate because the two upright shoulders 15 and the two bottom shoulders 20 impinge on the liquid body with consequent high turbulence. It is to be noted that while the upright vanes 14 act on the periphery of the liquid body the bottom vane 18 acts on the axial core of the liquid body.

As heretofore stated, the first stage of the mixing operation in which the shoulders 15 and 20 are effective terminates when the tumbler decelerates to the point that its rotation equals the rotation of the accelerating liquid body. Soon thereafter, the tumbler comes to rest in a tilted position as shown in FIG. 3, but the inertia of the liquid body causes the liquid body to continue to rotate clockwise at a rapid rate. In this second stage of the mixing operation the second set of upright shoulders 16 and 22 are effective for retarding impingement on the rotating liquid with consequent turbulence for mixing action and consequent deceleration of the rotating liquid.

At the tilted stationary position of the tumbler shown in FIG. 3, the tumbler rests on the exterior axially projecting bottom portion 12 and on a part of the bottom rim 10. The bottom rim 10 may be aptly termed prop means since it props up the tumbler when the tumbler is at rest. It is apparent that to keep the tilted tumbler from falling over, the prop means 10 must be located radially outwardly of the center of gravity of the tilted tumbler.

It is apparent that the invention saves time in mixing a drink. Thus in mixing an alcoholic beverage or in mixing an instant beverage such as instant tea made from powdered tea, the person serving the drink need merely twirl the tumbler instead of taking time to stir the contents by means of a spoon or a swizzle stick. It also may be appreciated that the spinning of the receptacle attracts attention and there is a certain attraction in the visible changing conditions of the mixing operation.

The second embodiment of the invention shown in FIG. 6 is similar in general to the first embodiment. The second embodiment has the same two diametrical opposite upright vanes 14. Instead of a single generally diametrical bottom vane, however, the second embodiment of the invention has six spaced radial vanes 25 on the inner bottom surface of the tumbler. For sanitary reasons the various vanes employed in both practices of the invention may be formed with fillets 26 at their junctures with the inner wall of the tumbler. The fillets make the vanes relatively easy to clean.

My description in specific detail of the selected embodiments of the invention will suggest various changes, substitutions and other departures from my disclosure within the spirit and scope of the appended claims.

I claim:

1. Means for mixing action on a liquid mixture, comprising:
   an upright receptacle to contain a body of the liquid mixture,
   said receptacle being small to permit the receptacle to be spun on its axis by hand manipulation,
   the receptacle having an exterior axially projecting bottom portion on which it may be spun to rotate about its axis,
   the receptacle having exterior prop means surrounding the projecting bottom portion at a higher level than the projecting bottom portion to cooperate with the projecting bottom portion to maintain the receptacle in a tilted liquid-holding position when the receptacle is at rest, said exterior prop means being radially outward from the center of gravity of the tilted receptacle,
   the mass of the receptacle relative to its volumetric capacity being high whereby when the receptacle is rapidly rotated on its axis the receptacle spins on said axial portion like a top and has sufficient inertia to rotate for a sufficient time period to impart substantial rotation to the liquid mixture so that when the receptacle decelerates to come to rest at a tilted position, the liquid mixture continues to rotate,
   whereby a rotational force briefly applied to the receptacle results in a mixing operation comprising a first stage in which the rotation of the receptacle exceeds the rotation of the liquid mixture and a second stage initiated while the receptacle is decelerating in which the rotation of the mixture exceeds the rotation of the receptacle.

2. Means for mixing action on a liquid mixture as set forth in claim 1 in which the cross sectional configuration of the interior of the receptacle is noncircular to promote turbulence in the mixture.

3. Means for mixing action on a liquid mixture as set forth in claim 1 in which the interior of the receptacle is formed with oppositely facing shoulders to act on the mixture with turbulent effect during the two stages, respectively, of the mixing operation.

4. Means for mixing action on a liquid mixture as set forth in claim 3 in which the oppositely facing shoulders are opposite surfaces of internal vanes that are integral with the receptacle.

5. Means for mixing action on a liquid mixture as set forth in claim 4 in which the vanes are formed with fillets to facilitate cleaning the interior of the receptacle.

6. Means for mixing action on a liquid mixture as set forth in claim 5 in which at least some of the vanes are inclined in cross section in one rotary direction for increased turbulent effect on the mixture when the rotation of the mixture relative to the receptacle is opposite to said rotary direction.

7. Means for mixing action on a liquid mixture as set forth in claim 5 in which said vanes include vanes on the inner side wall of the receptacle spaced apart circumferentially of the receptacle.

8. Means for mixing action on a liquid mixture as set forth in claim 5 in which the vanes include at least one vane on the inner bottom wall of the receptacle extending transversely of the receptacle.

9. A receptacle for serving a mixed beverage and for additionally premixing the beverage,
said receptacle being dimensioned to contain a serving of the beverage,
the bottom of the receptacle being formed with an exterior downward axial protuberance to permit the receptacle to spin like a top, the bottom of the receptacle being further formed with a surrounding peripheral portion slightly above the level of the protuberance to cooperate with the protuberance to support the receptacle in a stationary tilted position.
the mass of the receptacle relative to its size being large whereby when force is briefly applied to rotate the receptacle on its axis, the receptacle spins on said axial portion like a top in opposition to the drag of the serving and has sufficient inertia to rotate for a sufficient time period to impart substantial rotation to the serving so that when the receptacle decelerates to come to rest at a tilted position, the serving continues to rotate,
whereby the brief application of the force results in a mixing operation comprising a first stage in which the rotation of the receptacle exceeds the rotation of the serving and a second stage initiated while the receptacle is decelerating in which the rotation of the serving exceeds the rotation of the receptacle.

10. A receptacle as set forth in claim 9 in which the cross section of the interior of the receptacle is noncircular to promote turbulence in the mixture.

11. A receptacle as set forth in claim 9 in which the interior of the receptacle is formed with surfaces facing in opposite rotary directions respectively to act on the mixture with turbulent effect during the two stages, respectively, of the mixing operation.

12. A receptacle as set forth in claim 9 in which the receptacle is formed with integral interior vanes to promote turbulence in the mixture.

References Cited
UNITED STATES PATENTS

| | | | |
|---|---|---|---|
| 1,134,354 | 4/1915 | Seifke | 215—1 |
| 2,031,800 | 2/1936 | Thiele | 215—1 |

WALTER A. SCHEEL, *Primary Examiner.*

ROBERT W. JENKINS, *Examiner.*